United States Patent [19]

Smith

[11] Patent Number: 5,543,178
[45] Date of Patent: Aug. 6, 1996

[54] GROUT FINISHING METHOD WITH KIT

[76] Inventor: Harry W. Smith, 517 Enderby Rd., Chuluota, Fla. 32766

[21] Appl. No.: 452,026

[22] Filed: May 26, 1995

[51] Int. Cl.⁶ ........................................ B05D 3/12
[52] U.S. Cl. .................. 427/299; 52/742.16; 427/393.6; 427/355; 427/368
[58] Field of Search .................. 52/742.16; 427/299, 427/393.6, 355, 368

[56] References Cited

U.S. PATENT DOCUMENTS

| | | | |
|---|---|---|---|
| 3,706,696 | 12/1972 | Bernett et al. | 260/29.7 E |
| 3,817,012 | 6/1974 | Wack et al. | 52/315 |
| 3,854,267 | 12/1974 | Weiant et al. | 52/744 |
| 3,866,383 | 2/1975 | Bernett | 52/742.16 |
| 3,967,429 | 7/1976 | Weiant et al. | 52/742.16 |
| 4,143,019 | 3/1979 | Burley | 260/29.6 |
| 4,238,542 | 12/1980 | Burley | 428/58 |
| 4,507,424 | 3/1985 | Webster | 524/442 |
| 4,556,426 | 12/1985 | Chesney, Jr. et al. | 106/18.32 |
| 4,771,488 | 9/1988 | Markham | 4/631 |
| 5,287,667 | 2/1994 | Singhal | 52/392 |

*Primary Examiner*—Michael Lusignan
*Attorney, Agent, or Firm*—Edward M. Livingston, Esq.

[57] ABSTRACT

A method for accomplishing the above and other objectives has steps of applying a mild solution of acid to surfaces of grout and tile, letting the surfaces dry for approximately 12 hours, applying a grout colorant and sealing material, referred to as grout-treating material, to the grout and such surfaces of tile as the grout-treating material contacts in an application process, allowing grout-treating material on grout and tile surfaces to dry, cleaning the grout and tile surfaces with a non-solvent cleaner and then merely scraping and vacuuming or sweeping the grout-treating material from the surfaces. A small portion of the grout-treating material which might stick to surfaces of some types of tile in the event of errors in applying this method can be scraped off easily or removed with a scrub pad. The preferred acid is 3-to-15 percent oxalic acid in a solution with water. Similar proportions of muriatic acid or sulfanilic acid can be used as substitutes for oxalic acid. A preferred grout-treating material is marketed under the brand name of Lady Dy Colourant and Sealant. Some other solvent-based grout-treating materials also can be used. A kit for using this method has a gallon bucket, a measure of oxalic acid, a tile brush or paint brush, a pair of vinyl gloves and a quart of Lady Dy Colourant and Sealant.

15 Claims, No Drawings

GROUT FINISHING METHOD WITH KIT

BACKGROUND OF THE INVENTION

This invention relates to a method with a kit of materials and tools for treating, sealing and coloring grout with which tile and functionally similar material is adhered to floors and other structural surfaces.

Numerous materials and methods are known for attaching tile and like materials to surfaces and then, or later as necessary, sealing the grout that is exposed between the tile. However, there is no known materials and method which allows one to treat, seal and color ceramic tile at the same time in an easy and cost-effective manner as taught by this invention. Examples of more complex material and related methods for restoring grout are described in prior patent documents. U.S. Pat. No. 4,507,424, issued to Webster on Mar. 26, 1985, teaches a solution of water with a film-forming polymeric resin, a compatible surfactant, alkali metal salt, sodium hypochlorite, pigment and zinc oxide. This solution renders the grout porous for receiving coloring and attaching build-up material contained in the solution without adhering to tile at sides of the grout. U.S. Pat. Nos. 4,238,542 and 4,143,019 issued to Burley teach other complex grout-covering materials designed to condition the grout to receive the materials without sticking to the tile. U.S. Pat. No. 3,854,267, issued to Weiant, et al. on Dec. 17, 1974, taught additional aqueous mortar compositions for covering and coloring grout without adhering to tile bordered by the grout.

A problem with these and other previous materials and methods for coloring, sealing and building up grout has been to treat the grout and to prevent grout-treating material from sticking to tile by devising highly complicated grout-treating materials to prevent such tile damage from treating grout. Previous grout-treating materials actually created much of the tile-damaging problems they were designed to avoid.

SUMMARY OF THE INVENTION

In light of problems that have existed and that continue to exist in this field, objectives of this invention are to provide a grout-finishing method and kit which:

Conditions grout for absorbing grout-coloring, grout-build-up and grout-sealing materials inexpensively and easily;

Maintains tile for non-adherence of inexpensive and effective grout-coloring, grout-build-up and grout-sealing materials; and Provides a convenient kit containing materials and tools for conditioning grout and tile accordingly and for coloring, sealing and building up the grout as desired with an inexpensive and effective grout-coloring, grout-build-up and grout-sealing material.

This invention accomplishes the above and other objectives by applying a mild solution of acid to surfaces of grout and tile, letting the surfaces dry for approximately 12 hours, applying a grout colorant and sealing material, referred to as grout-treating material, to the grout and such surfaces of tile as the grout-treating material contacts in an application process, allowing grout-treating material on grout and tile surfaces to dry, cleaning the grout and tile surfaces with a non-solvent cleaner and then merely vacuuming or sweeping the grout-treating material from the surfaces. A small portion of the grout-treating material which might stick to surfaces of some types of tile in the event of errors in applying this method can be scraped off easily if not removed with sweeping. The preferred acid is 3-to-15 percent oxalic acid in a solution with water. Similar proportions of muriatic acid or sulfanilic acid can be used as substitutes for oxalic acid. A preferred grout-treating material is marketed under the brand name of Lady Dy Colourant and Sealant. Some other solvent-based grout-treating materials also can be used. Most grout-treating materials which have been prepared specially for not sticking to tile and which are relatively expensive are not necessary. A kit for using this method has a gallon bucket, a measure of oxalic acid, a tile brush, a pair of vinyl gloves, paint brush and a quart of Lady Dy Colourant and Sealant.

DESCRIPTION OF PREFERRED EMBODIMENT

It has been discovered and verified by experiment that applying a mild acidic solution to grout bordering tile that is held in place with the grout on a tiled surface prepares the grout for adherence of some known solvent-based grout-treating materials while simultaneously not damaging or etching the tile, thus preventing adherence of the solvent-based grout-treating materials to surfaces of the tile. Previously, relatively complex grout-treating material has been devised for production at considerably higher costs than less complex solvent-based grout-treating materials. In addition, methods for applying the relatively complex solvent-based materials have required more complex application methods than taught by this invention.

In a first conditioning step A, a preferred embodiment of this method is first to apply an aqueous solution of three-to-fifteen percent oxalic acidic to a tiled area that has been cleaned of all but stains and then dried thoroughly. A wetting application of the aqueous solution simultaneously opens pores of the grout for adherence of certain grout-treating materials while conditioning the tile not to be adhered to by the grout-treating materials.

The aqueous solution is preferably mixed on site for most use conditions in single homes and offices. Vinyl gloves should be worn for safety when mixing the acid with the water and stirring it to achieve a desired aqueous solution. A tile brush can be used to mix by appropriate stirring of the crystal acid and water.

Cleaning the tiled surface with a broom or vacuum cleaner prior to wetting the grout and tile with the aqueous solution is adequate for most conditions. Gummy substances and some mildew growths may require special cleaning. Stains and dies do not need to be removed, however, because they will be covered by the grout-treating materials.

After wetting the grout and the tile with the aqueous solution, the aqueous solution is allowed to set for soaking a few minutes.

After wetting and soaking for a few minutes, the grout is scrubbed lightly with a brush and mopped up with clean water.

Drying overnight after mopping up is generally sufficient for thorough drying in most conditions of atmospheric humidity and heat. Special drying may be required in some atmospheric conditions.

In a second step B of applying the grout-treatment material, the grout-treatment material, usually contained in a can like paint, is shaken or otherwise agitated to mix components of the grout-treatment material after having been stored without movement and allowed to precipitate in most use conditions.

A paint brush or, alternatively, one small tile using a close map roller is used then to apply the grout-treatment material onto the grout and such bordering tile surfaces as may be contacted by the tile brush in strokes of preferably not more than one foot long.

After application of the grout-treatment material to the grouted surfaces with the paint brush, the wet tiled surfaces should not be wiped or otherwise touched for 20 minutes (total curing time is five days). Tiled surfaces so treated should never be cleaned, rubbed or otherwise affected by solvent-based cleaners or other solvent-based materials. Pine Sol and Lysol are examples of cleaners not to be used for cleaning tiles with grout which has been treated in accordance with this invention.

In a third step C of clean up, the tiled surface is merely swept with a broom or vacuumed. If any of the design grout-treatment material adheres to the tile as a result of any errors in applying the design aqueous solution and the design grout-treatment material in accordance with this method, such material can be scraped off with conventional scraper and razor tools. Wisps or thin streaks of material may alternately be removed with a non-metallic scrub pad, such as that sold under the trademark SCOTCH BRIGHT.

The preferred oxalic acid can be substituted by muriatic acid or sulfanilic acid. Also a substitution for oxalic acid is a volume of white vinegar having acidity per volume of water about equal to acidity of oxalic acid.

The preferred grout-treatment material has a solvent base and currently has a trade name of Lady Dy Colourant and Sealant. Other grout-treatment materials having a solvent base and that are otherwise most similar to Lady Dy Colourant and Sealant also can be used.

For treating grout with Lady Dy Colourant and Sealant, a Lady Dy Colourant and Sealant Kit containing at least one gallon bucket, at least one measure of oxalic acid, at least one tile brush, at least one pair of vinyl gloves, one 1½-inch paint brush and at least one quart of Lady Dy Colourant and Sealant can be used. For treating grout with grout-treating materials other than Lady Dy Colourant and Sealant, a grout-treatment kit containing at least one gallon bucket, at least one measure of oxalic acid, at least one tile brush, at least one pair of vinyl gloves, one 1½-inch paint brush and at least one quart of a design grout-treatment material can be used.

Area coverage with Lady Dy Colourant and Sealant as supplied in the Lady Dy Colourant and Sealant Kit is approximately 1,200 square feet of 8-inch tile with a ⅜ inch grout seam.

A new and useful method for applying grout-treatment material to grout bordering tile having been described, all such modifications, adaptations, substitutions of equivalents, combinations of parts, applications and forms thereof as described by the following claims are included in this invention.

I claim:

1. A method for applying grout-treatment material to grout bordering tile that is held in place with the grout on a pre-existing tiled surface comprising:

A. conditioning the tiled surface by
preparing a design aqueous solution by mixing a desired volume of water and a volume of a design acid that is about three-to-fifteen percent of the desired volume of the water,
applying the design aqueous solution to the grout sufficiently to wet the grout and the tile when the grout and tile are dry and free of extraneous material and dirt except for possible stains,
allowing the design aqueous solution to soak into the grout;

B. applying the grout-treatment material by
shaking or otherwise mixing a can of design grout-treatment material for application onto the grout,
applying the design grout-treatment material onto the grout with a tile brush in preferably up to one-foot strokes that may cause the paint brush to deposit the design grout-treatment material onto incidental portions of the tile grout also,
allowing the design grout-treatment material to dry on the grout and on the incidental portions of the tile without wiping, brushing or otherwise disturbing for about twenty minutes; and C. cleaning up by
sweeping the tiled surface with a broom.

2. A method as described in claim 1 and further comprising:
scraping off such of the design grout-treatment material as may adhere to the tile as a result of any errors in applying the design solution and the design grout-treatment material in accordance with the method described in claim 1.

3. A method as described in claim 1 wherein:
the design acid is oxalic acid.

4. A method as described in claim 1 wherein:
the design acid is substituted by muriatic acid or sulfanilic acid.

5. A method as described in claim 1 wherein:
the design acid is substituted by a volume of white vinegar having acidity per volume of water about equal to acidity of oxalic acid.

6. A method as described in claim 1 wherein:
the design grout-treatment material has a solvent base.

7. A method as described in claim 1 wherein:
the design grout-treatment material is a type of grout-treatment containing a colorant and sealant.

8. A method as described in claim 7 wherein:
solvent-based cleaners and other solvent-based products are prevented from coming in contact with the grout bordering tile that is held in place with the grout on the tiled surface.

9. A method as described in claim 6 wherein:
solvent-based cleaners and other solvent-based products are prevented from coming in contact with the grout bordering tile that is held in place with the grout on the tiled surface.

10. A method as described in claim 6 wherein:
the design acid is oxalic acid.

11. A method as described in claim 6 wherein:
the design acid is substituted by muriatic acid or sulfanilic acid.

12. A method as described in claim 6 wherein:
the design acid is substituted by a volume of white vinegar having acidity per volume of water about equal to acidity of oxalic acid.

13. A method as described in claim 1 wherein:
steps for applying the grout-treatment material to the grout bordering tile that is held in place with the grout on the tiled surface are performed with supplies packaged in a grout-treatment kit containing at least one gallon bucket, at least one measure of oxalic acid, at least one tile brush, at least one pair of vinyl gloves, one paint brush and at least one quart of a design grout-treatment material.

14. A method as described in claim 7 wherein:

steps for applying the grout-treatment material to the grout bordering tile that is held in place with the grout on the tiled surface are performed with supplies packaged in a kit containing at least one gallon bucket, at least one measure of oxalic acid, at least one tile brush, at least one pair of vinyl gloves, one paint brush and at least one quart of a solvent-based colorant and sealant.

15. A method for applying grout-treatment material to grout bordering tile that is held in place with the grout on a pre-existing tiled surface comprising:

A. conditioning the tiled surface by preparing a design aqueous solution by mixing a desired volume of water and a volume of a design acid that is about three-to-fifteen percent of the desired volume of the water, applying the design aqueous solution to the grout sufficiently to wet the grout and the tile when the grout and tile are dry and free of extraneous material and dirt except for possible stains, allowing the design aqueous solution to soak into the grout for a period of a five to ten minutes, cleaning the grout and tile with clean water, allowing the grout to dry about 12 hours;

B. applying the grout-treatment material by shaking or otherwise mixing a can of design grout-treatment material for application onto the grout, applying the design grout-treatment material onto the grout with a tile brush in preferably up to one-foot strokes that may cause the tile brush to deposit the design grout-treatment material onto incidental portions of the tile also, allowing the design grout-treatment material to dry on the grout and on the incidental portions of the tile without wiping, brushing or otherwise disturbing for about twenty minutes; and C. cleaning up by vacuuming or sweeping the tiled surface with a broom.

\* \* \* \* \*